US008433672B2

(12) United States Patent
Shin et al.

(10) Patent No.: US 8,433,672 B2
(45) Date of Patent: Apr. 30, 2013

(54) METHOD AND APPARATUS FOR VEHICLE COMPONENT HEALTH PROGNOSIS BY INTEGRATING AGING MODEL, USAGE INFORMATION AND HEALTH SIGNATURES

(75) Inventors: Kwang-Keun Shin, Rochester Hills, MI (US); Mutasim A. Salman, Rochester Hills, MI (US); Yilu Zhang, Northville, MI (US); Xidong Tang, Sterling Heights, MI (US); Hong S. Bae, Farmington Hills, MI (US); Mark N. Howell, Rochester Hills, MI (US); Satish Rajagopalan, Knoxville, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 12/707,456

(22) Filed: Feb. 17, 2010

(65) Prior Publication Data

US 2011/0202494 A1 Aug. 18, 2011

(51) Int. Cl.
*G06F 15/00* (2006.01)
*G06N 15/18* (2006.01)

(52) U.S. Cl.
USPC .......... 706/62

(58) Field of Classification Search .......... 706/62
See application file for complete search history.

(56) References Cited

PUBLICATIONS

S. Martorell et al., "Age-dependent reliability model considering effects of maintenance and working conditions", Reliability Engineering and Safety Systems 64 (1999) pp. 19-31.*

B. Bertsche, Reliability in Automotive and Mechanical Engineering, chapt. 6, Springer-Verlag 2008, pp. 191-204.*

O. Basile et al., "Identification of reliability models for non repairable and repairable systems with small samples", Advances in Maintenance and Modeling, Simulation and Intelligent Monitoring of Degradation, Proceeding of IMS'2004, pp. 1-8.*

Luxhoj et al., "Comparison of regression and neural network modesl for prediction of inspection profiles for aging aircraft", IIE Trans. 29 (1997), pp. 91-101.*

* cited by examiner

*Primary Examiner* — Kakali Chaki
*Assistant Examiner* — Vincent Gonzales
(74) *Attorney, Agent, or Firm* — John A. Miller; Miller IP Group, PLC

(57) ABSTRACT

A system and method for determining the health of a component includes retrieving measured health signatures from the component, retrieving component usage variables, estimating component health signatures using an aging model, determining an aging derivative using the aging model and calculating an aging error based on the estimated component health signatures, the aging derivative and the measured health signatures.

19 Claims, 3 Drawing Sheets

METHOD AND APPARATUS FOR VEHICLE COMPONENT HEALTH PROGNOSIS BY INTEGRATING AGING MODEL, USAGE INFORMATION AND HEALTH SIGNATURES

BACKGROUND

1. Field of the Invention

This invention relates generally to monitoring the state of health of vehicle components and, more particularly, to a component prognosis technique that utilizes the concept of an observer to integrate component health signatures, usage information and a degradation model.

2. Background

There is a constant effort in the automotive industry to improve the quality and reliability of vehicles by incorporating fault diagnosis and prognosis features into vehicles. One area of particular interest is the prognosis of individual vehicle components such as a battery or alternator. Several techniques have been developed that include monitoring a component's operating parameters, then applying an algorithm that compares the operating data to historical data to predict the behavior, age and remaining life of a component. These techniques, however, are one dimensional in that they don't integrate other factors that may contribute to the age and remaining life of a component.

Therefore, what is needed is a more robust and consistent multi-dimensional approach to component prognosis that utilizes the concept of an observer to integrate component health signatures, usage information and a degradation model.

SUMMARY

A system and method for determining the health of a component includes retrieving measured health signatures from the component, retrieving component usage variables, estimating component health signatures using an aging model, determining an aging derivative using the aging model and calculating an aging error based on the estimated component health signatures, the aging derivative and the measured health signatures.

Additional features of the present invention will become apparent from the following description and appended claims, taken in conjunction with the accompanying drawings.

DETAILED DESCRIPTION OF THE EMBODIMENTS

The following discussion of the embodiments of the invention are directed a system and method for monitoring the health of vehicle components. The aforementioned embodiments are merely exemplary in nature, and are in no way intended to limit the invention, its applications or uses.

Figure 1:
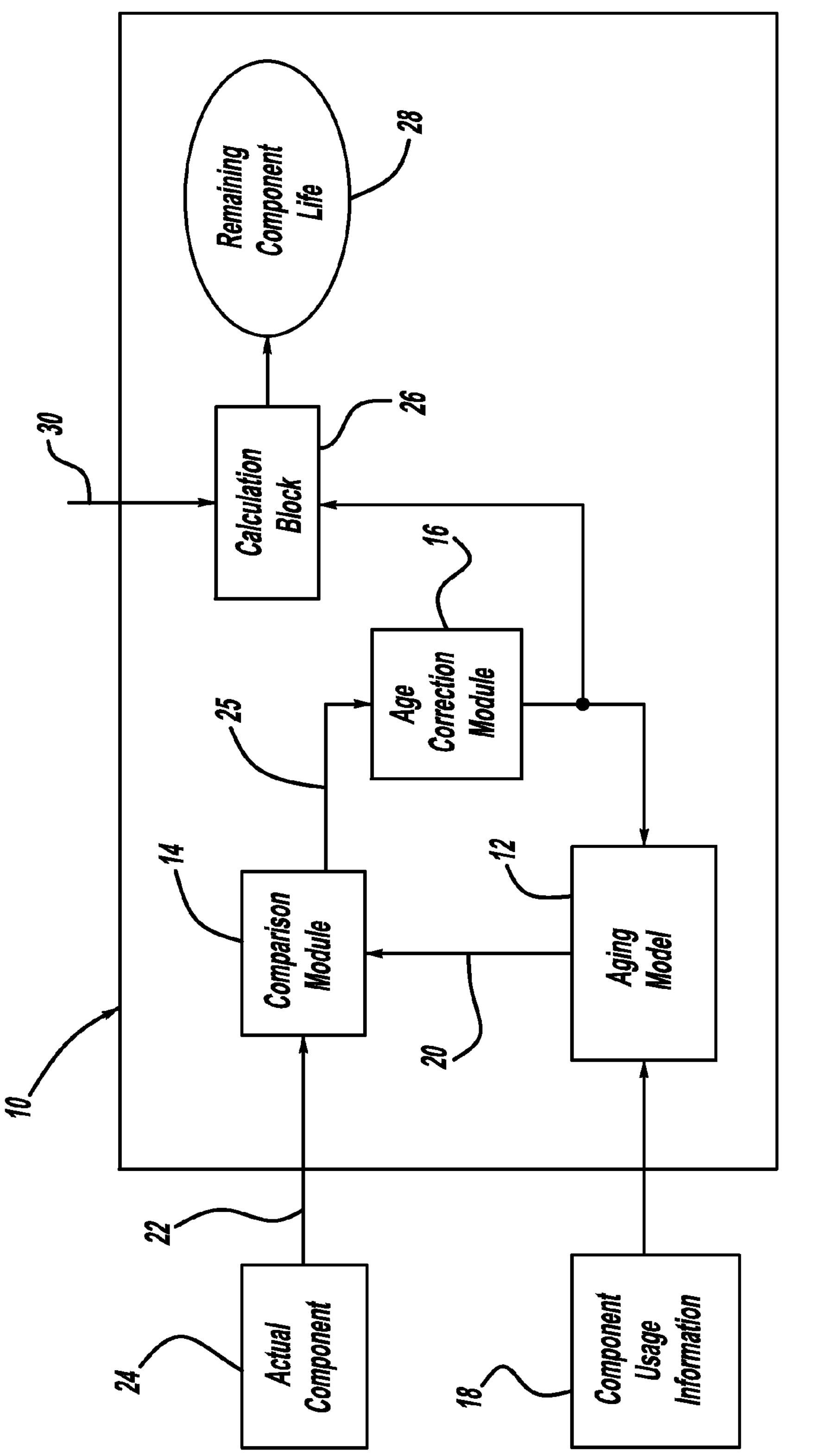
FIG. 1 illustrates an exemplary component prognosis system, according to one embodiment.

FIG. 1 illustrates an exemplary component prognosis system 10 for a vehicle. The system includes an aging model 12 in communication with both a comparison module 14 and an age correction module 16. The aging model 12 is configured to receive component usage information 18 such as, but not limited to, component temperature, environmental conditions, power up times, power down times and length of use. The aging model 12 is also configured to receive an age estimation 19 from the age correction module 16. The aging model 12, also referred to as a degradation model, is a collection of one or more mathematical models used to determine the estimated age of a component. The mathematical models may include, but are not limited to, Arrhenius equations and Paris equations.

The aging model 12 is also configured to determine estimated component health signatures and age derivatives 20 based on the component usage information 18. In general, a component health signature refers to a component specific characteristic that describes the functionality of the component. In one non-limiting example, a component health signature may be a component's voltage, current, capacitance or resistance. An age derivative is the change of the component health signature with respect to the change of the age. The estimated component health signatures and age derivatives generated by the aging model 12 are input to the comparison module 14.

The comparison module 14 is configured to receive and compare measured component health signatures 22 from the actual component 24 to the estimated component health signatures 20 from the aging model 12. The comparison also includes calculating an aging error 25 using the measured component health signatures 22 and the estimated component health signatures 20. In one embodiment, the age error is calculated using an equation, such as:

$$e=\left(\frac{\partial\hat{\theta}}{\partial\hat{\alpha}}\right)^{T}Q(\theta-\hat{\theta}) \tag{1}$$

where $\theta$ is the vector of measured component health signatures 22, $\hat{\theta}$ is the vector estimated component health signatures 20, $\hat{\alpha}$ is the age estimation 19, $(\partial\hat{\theta}/\partial\hat{\alpha})$ indicates the age derivative, and Q is a matrix indicating weighting factor of different signatures and T represents the transpose of a matrix.

In this example, equation (1) is the derivative of the cost function in equation (2) with respect to the age estimation.

$$J=\frac{1}{2}(\theta-\hat{\theta})^{T}Q(\theta-\hat{\theta}) \tag{2}$$

However, as understood by one of ordinary skill in the art, any suitable algorithm or equation may be used to calculate the age error including, but not limited to, a fusion algorithm or fuzzy logic.

Based on the value of the age error 25, the component age estimation is corrected using the age correction module 16, which adjusts the previously estimated age of the component using the calculated age error value. Equation (3) below illustrates an exemplary equation for correcting the age estimation where $\hat{\alpha}$ is the estimated age and K represents a gain.

$$\hat{\alpha}=\hat{\alpha}+Ke \tag{3}$$

When the value of the age error 25 is sufficiently low, the age estimation is sent to calculation block 26 where a percentage of remaining component life 28 is calculated using a maximum life expectancy value 30 for that specific component.

Figure 2:
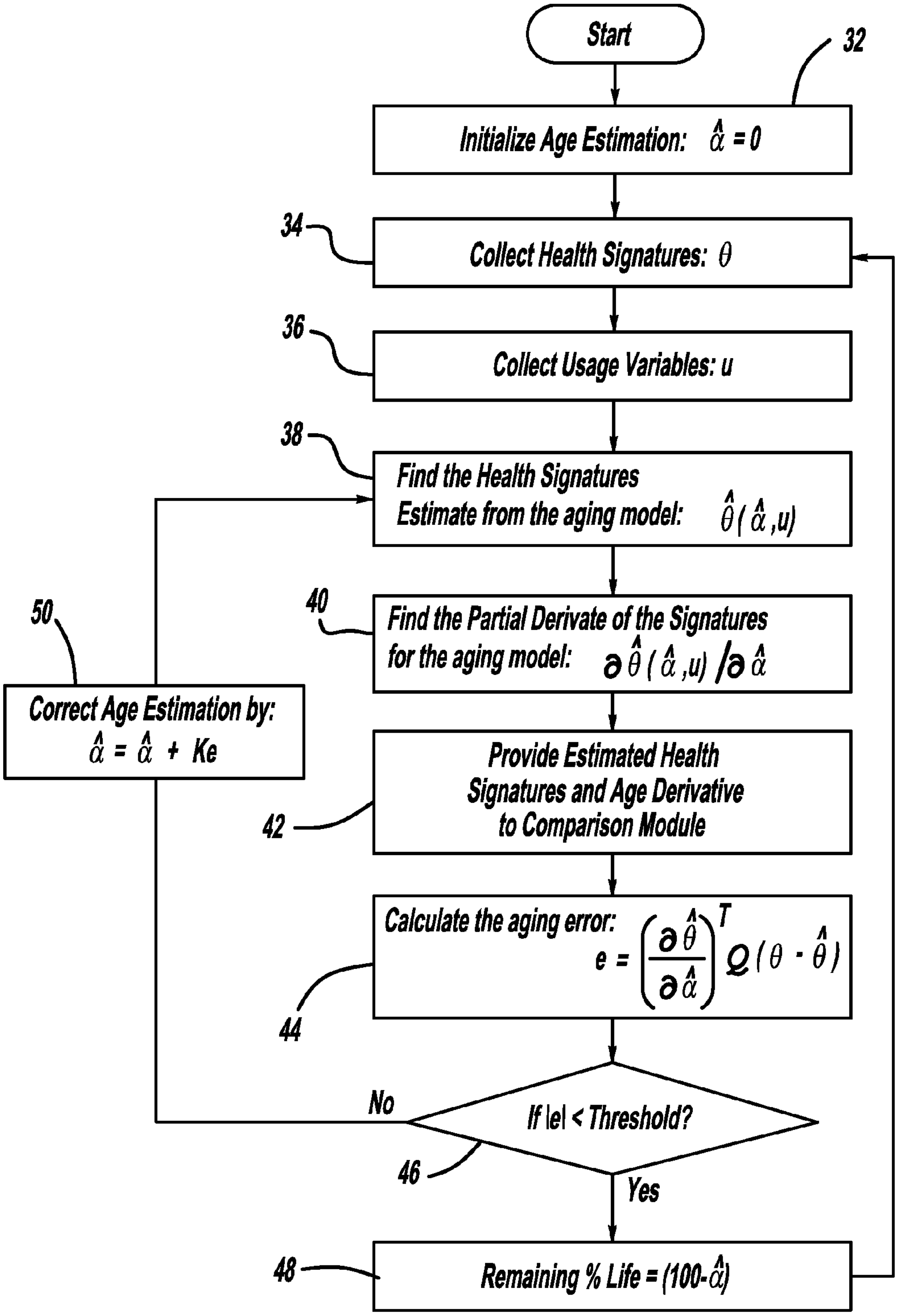
FIG. 2 is a flow chart illustrating an exemplary algorithm for determining the age and remaining life of a component according to the system of FIG. 1.

FIG. 2 is a flow chart illustrating an exemplary algorithm 10 for determining the age and remaining life of a component according to the system of FIG. 1. At step 32, the age estimation $\hat{\alpha}$ for the aging model 12 is initialized to zero indicating a new component. At steps 34 and 36, respectively, the health signatures θ from the actual component 24 and the usage variables u from the component usage information 18 are collected. At step 38, the aging model 12 determines the estimated health signatures $\hat{\theta}$ a using particular aging model, which in this example, is given by:

$$\hat{\theta}(\hat{\alpha},u) \quad (4)$$

where the estimated health signatures $\hat{\theta}$ is a function of $\hat{\alpha}$ and u.

At step 40, the aging model 12 determines the age derivative of the health signatures, which in this example, is given by:

$$\partial\hat{\theta}(\hat{\alpha},u)/\partial\hat{\alpha} \quad (5)$$

At step 42, the estimated health signatures and the age derivatives 20 from the aging model 12 are provided to the comparison module 14. At step 44, the comparison module 14 calculates the aging error 25 using equation (1). At step 46 the calculated aging error is compared to a threshold in the age correction module 16. If the aging error is less than the threshold, the remaining component life, which is generally given as a percentage, is calculated at step 48 and the process returns to step 34 to continually re-evaluate the age of the component. If the aging error is not less than the threshold, at step 50 the age correction module 16 calculates an age correction using equation (3) above. Once the corrected age is determined, the process continues at step 38 until the aging error is minimized to a level below the threshold.

Figure 3:
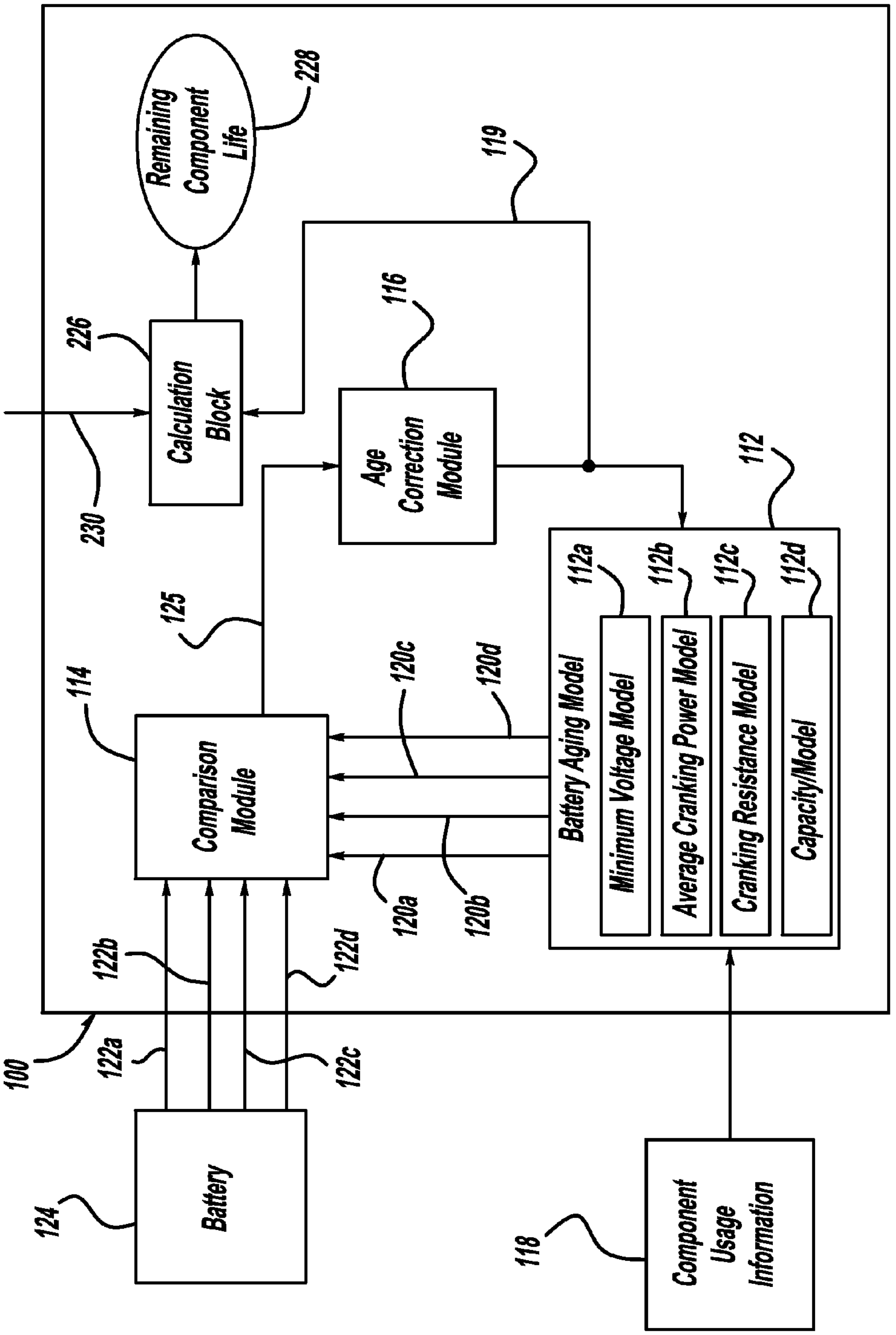
FIG. 3 illustrates the exemplary component prognosis system of FIG. 1, wherein the component is a battery.

FIG. 3 illustrates an exemplary component prognosis system 100, similar to FIG. 1, wherein the component is a battery. The system includes an aging model 112 in communication with both a comparison module 114 and an age correction module 116. The aging model 112 is configured to determine the estimated component health signatures and age derivatives 120 based on the component usage information 118, which in this case may be the battery temperature, state of charge and other environmental conditions. In this example, the aging model 112 includes a minimum voltage model 112*a*, an average cranking power voltage model 112*b*, a cranking resistance model 112*c* and a capacity model 112*d*. These models, respectively, are used to calculate the estimated values for minimum voltage 120*a*, average power 120*b*, cranking resistance 120*c* and reserve capacity 120*d*.

The comparison module 114 is configured to receive and compare the measured component health signatures 122 from the battery 124 to the estimated component health signatures 120*a-d* from the aging model 112. In this example, the measured component health signatures 122 include minimum voltage 122*a*, average power 122*b*, cranking resistance 122*c* and reserve capacity 122*d*. The comparison also includes calculating an aging error 125 using the measured component health signatures 122 and the estimated component health signatures 120.

Like the system of FIG. 1, based on the value of the age error 125, the component age estimation is corrected using the age correction module 116, which adjusts the previously estimated age of the component using the calculated age error value. When the value of the age error 125 is sufficiently low, the age estimation 119 is sent to calculation block 226 where a percentage of remaining component life 228 is calculated using age estimation and a maximum life expectancy value 230 for that specific component.

The system described herein may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as “a”, “the”, “said”, etc. should be read to recite one or more of the indicated elements unless a claim recites an explicit limitation to the contrary.

What is claimed is:

1. A method for determining the health of a component, the method comprising:
retrieving measured health signatures from the component;
retrieving component usage variables;
estimating component health signatures using an aging model and the component usage variables;
determining an aging derivative using the aging model;
calculating an aging error based on the estimated component health signatures, the aging derivative and the measured health signatures; and
recalculating the estimated component health signatures and the aging derivative until the aging error is below a predetermined threshold.

2. The method of claim 1, further including calculating a corrected age of the component based on an estimated age and the aging error.

3. The method of claim 1, further including determining if the aging error is below a predetermined threshold.

4. The method of claim 3, further including calculating a remaining life of the component if the aging error is below the predetermined threshold.

5. The method of claim 1, further including initializing the estimated component age to zero.

6. The method of claim 1, further including calculating an estimated age of the component based on the aging error.

7. A system for determining the health of a component, the system comprising:
a computing device with a memory that includes:
an aging model configured to calculate estimated component health signatures based on a plurality of component usage variables;
a comparison module configured to calculate an aging error based on the estimated component health signatures and measured component health signatures; and
a calculation block configured to calculate an estimated age of the component based on the aging error, and to determine the remaining life of the component based on a maximum life expectancy and the estimated age of the component.

8. The system of claim 7, further including an aging correction module configured to calculate a corrected age of the component based on an estimated age and the aging error.

9. The method of claim 7, wherein the aging model and the comparison module are configured to recalculate, respectively, the estimated component health signatures and the aging derivative until the aging error is below a predetermined threshold.

10. A system that includes a non-transitory computer-readable medium tangibly embodying computer-executable instructions for:
initializing an age estimation;
retrieving measured health signatures from the component;
retrieving component usage variables;
estimating component health signatures using the age estimation and the component usage variables;
determining an aging derivative using the partial derivative of the estimated health signature with respect to the age estimation; and
calculating an aging error based on the estimated component health signatures, the aging derivative and the measured health signatures.

11. The system of claim 10, further including calculating a corrected age of the component based on the age estimation and the aging error.

12. The system of claim 10, further including determining if the aging error is below a predetermined threshold.

13. The system of claim 12, further including calculating a remaining life of the component if the aging error is below the predetermined threshold.

14. The system of claim 10, further including recalculating the estimated component health signatures and the aging derivative until the aging error is below a predetermined threshold.

15. The system of claim 10, further including initializing the age estimation to zero.

16. The system of claim 10, further including revising the age estimation based on the aging error.

17. The system of claim 10, where estimating component health signatures using the age estimation and the component usage variables uses an aging model.

18. The system of claim 17, where determining an aging derivative using the partial derivative of the estimated health signature with respect to the age estimation uses the ageing model.

19. The system of claim 10, where determining an aging derivative using the partial derivative of the estimated health signature with respect to the age estimation uses an ageing model.

* * * * *